United States Patent
Noda et al.

[11] Patent Number: 6,083,647
[45] Date of Patent: Jul. 4, 2000

[54] NON-AQUEOUS ELECTROLYTE COMPRISING AN ALUMINUM COMPOUND AND A METHOD FOR THE ELECTRODEPOSITION OF ALUMINUM FROM THE ELECTROLYTE

[75] Inventors: Kazuhiro Noda; Kenichi Takahashi; Koichi Tanaka; Haruo Watanabe, all of Kanagawa, Japan

[73] Assignee: Sony Corporation, Tokyo, Japan

[21] Appl. No.: 08/103,792

[22] Filed: Aug. 10, 1993

[30] Foreign Application Priority Data

Aug. 14, 1992 [JP] Japan ................................. 4-239041
Feb. 9, 1993 [JP] Japan ................................. 5-045842

[51] Int. Cl.[7] .................................................. H01M 4/02
[52] U.S. Cl. .................................................. 429/324
[58] Field of Search .................... 429/194, 199, 429/201, 188, 324, 326

[56] References Cited

U.S. PATENT DOCUMENTS

4,269,911  5/1981  Fukuoka et al. .................... 429/194
4,537,843  8/1985  Shishikura et al. ................. 429/192
4,550,067  10/1985 Horiba ................................ 429/213

Primary Examiner—Maria Nuzzolillo
Attorney, Agent, or Firm—Hill & Simpson

[57] ABSTRACT

A non-aqueous electrolyte comprises an aluminium halide and a quaternary ammonium halide dissolved in a non-aqueous solvent. A non-aqueous electrolytic cell is also described, which comprises an anode made of Al or its alloy, an cathode and the non-aqueous electrolyte provided between the anode and the cathode. The non-aqueous electrolyte is suitable for electrodeposition of aluminium from the electrolyte. Because aluminium is reversibly electrodeposited from and dissolved in the electrolyte, the electrolyte is usable for making secondary cells having good charge and discharge characteristics and a high energy density.

2 Claims, 6 Drawing Sheets

NON-AQUEOUS ELECTROLYTE COMPRISING AN ALUMINUM COMPOUND AND A METHOD FOR THE ELECTRODEPOSITION OF ALUMINUM FROM THE ELECTROLYTE

BACKGROUND OF THE INVENTION

1. Field of the Invention

This invention relates to non-aqueous electrolytes comprising aluminium compounds. The invention also relates to cells and an electrodeposition method using the non-aqueous electrolyte.

2. Description of the Related Art

It is considered that use of aluminium as an anode material of cells leads to fabrication of cells with a high energy density at low costs. Accordingly, cells using an Al anode have been accepted as promising in the future. This is because the theoretical energy density per unit volume of Al is as high as 8050 Ah/l which is about four times larger than that of lithium. In addition, the standard electrode potential of an Al relative to a standard hydrogen electrode is −1.66 V, so that if Al is used in combination with an appropriate cathode material, the resultant cell may be interchangeable with existing alkaline dry cells or silver cells. In this sense, cells using Al as an anode are full of promise, for which developments of such cells have been extensively made. For this purpose, several problems have to be solved including those problems on the selection of liquid electrolyte, the selection of electrode material, and how to arrange a cell using an Al anode. Of these, it is the most important how to select or formulate electrolyte.

As is well known in the art, Al has been made according to an alumina electrolitic refining which requires a complicated operational procedure and a vast of electric power. Accordingly, there is a demand for the electrodeposition of Al by a simple manner. In this case, the selection of a liquid electrolyte is important.

In general, aluminium is more unlikely to be thermodynamically reduced than hydrogen, so that any electrochemical reversible reaction cannot be expected in aqueous solution systems. In addition, aluminium has an insulating and high-packed passive state natural oxide layer on the surface due to high affinity for oxygen atoms. This makes it very difficult to cause aluminium to be dissolved out at the time of discharge. As a consequence, polarity becomes great, or it will be assumed that the passive state layer is more grown through anodization.

Under these circumstances, electrolytes for primary or secondary batteries or cells making use of Al or electrolytes used for electrodeposition of Al have been proposed including, for example, organic solvent-based non-aqueous electrolytes such as used in lithium electrochemical cells, and ether-base or molten salt-based non-aqueous electrolytes. In recent years, there has also been proposed use of non-aqueous electrolytes which comprise room temperature-molten salts composed of aluminium halides/N-alkylpyridinium halides, or room temperature-molten salts composed of aluminium halides/N-alkylimidazolinium halides.

In general, however, non-aqueous electrolytes have the problem that their conductivity are lower by one or two orders of magnitude than that of aqueous electrolytes. For instance, where cells are fabricated using organic solvent-based non-aqueous electrolytes as used in lithium electrochemical cells, there arises the problem that because of the low conductivity of the electrolyte, the load characteristics of the resultant cell are lowered. In addition to the problem on the conductivity, with the ether non-aqueous electrolytes, there is a problem on handling because of the ease in firing of ethers. With non-aqueous electrolytes comprising molten salts, temperatures higher than 200° C. are needed for working operations, thus presenting the problem that it is not possible to work the cell at normal temperatures. With non-aqueous electrolytes comprising room temperature-molten salts, the workable range is so narrow that once the cell has been used outside the workable temperature range, the electrolyte may be solidified or the kind or concentration of ions in the electrolyte may be changed, with a serious problem on stability.

SUMMARY OF THE INVENTION

It is therefore an object of the invention to provide a non-aqueous electrolyte which can solve the problems of the prior art counterparts.

It is another object of the invention to provide a non-aqueous electrolyte which can reduce polarity on discharge of cells making use of an Al or Al alloy anode.

It is a further object of the invention to provide a non-aqueous electrolyte which enables electrodeposition of Al at ambient temperatures.

It is a still further object of the invention to provide a non-aqueous electrolyte cell which makes use of the non-aqueous electrolyte mentioned above whereby good discharge characteristics are obtained.

It is another object of the invention to provide a method for the electrodeposition of Al in which the electrolyte of the type mentioned above is used.

In accordance with one embodiment of the invention, there is provided a non-aqueous electrolyte which comprises, in combination, an aluminium halide and a quaternary ammonium halide in a non-aqueous solvent.

When the non-aqueous electrolyte is applied to a cell which comprises an anode made of Al or an Al alloy, polarity at the time of discharge can be reduced with good discharge characteristics.

According to another embodiment of the invention, there is also provided a non-aqueous electrolyte cell which comprises an anode made of Al or an Al alloy, a cathode in a spaced relation with the anode, and a separator provided between the anode and the cathode and impregnated with a non-aqueous electrolyte, the non-aqueous electrolyte comprising an aluminium halide and a quaternary ammonium halide in a non-aqueous solvent.

If the non-aqueous electrolyte of the invention is used, the electrodeposition of Al can be conveniently conducted by a simple manner.

Thus, according to a further embodiment of the invention, there is provided a method for electrodepositing Al which comprises subjecting a non-aqueous electrolyte of the type set out above to electrodeposition.

When the non-aqueous electrolyte of the invention is used, Al can be reversibly electrodeposited from and dissolved in the non-aqueous electrolyte. Accordingly, it will be possible to fabricate a secondary cell which exhibits good charge and discharge characteristics and has a high energy density.

DESCRIPTION OF THE PREFERRED EMBODIMENTS

The non-aqueous electrolyte of the invention should comprise, in combination, an aluminium halide and a quaternary ammonium halide in a non-aqueous solvent. The aluminium halides preferred in the present invention are anhydrous halides of the general formula, $AlX_3$, wherein X represents Cl, Br or I. If the concentration of the aluminium halide is too low, the capacitance of the resultant cell does not reach a practical level, resulting in too low conductivity. On the other hand, when the concentration is too high, the halide is unlikely to dissolve in a non-aqueous solvent. Preferably, the concentration is in the range of from 0.1 to 10.0 moles/liter of the electrolyte.

If the non-aqueous electrolyte is applied to a cell, the concentration of the halide is more preferably in the range of 0.1 to 2.0 moles/liter and most preferably from 0.75 to 1.5 moles/liter. On the other hand, if the electrolyte is applied for the electrodeposition, the concentration of the halide is more preferably in the range of from 0.5 to 10.0 moles/liter and most preferably from 1.3 to 3.3 moles/liter.

The quaternary ammonium halides which are the other ingredient of the electrolyte of the invention are preferably those compounds of the following formula wherein $R_1$, $R_2$, $R_3$ and $R_4$ independently represent a hydrocarbon group, and Y is a counter ion. The hydrocarbon group has preferably up to 10 carbon atoms. Examples of the hydrocarbon group include, an alkyl group such as a methyl group, an ethyl group, a propyl group or the like, an aryl group such as a phenyl group, and an aralkyl group such as a benzyl group. These hydrocarbon groups may have substituents such as a trifluoromethyl group. As a matter of course, $R_1$, $R_2$, $R_3$ and $R_4$ may be the same or different. The counter ion represented by $Y^-$ may be various anions such as a perchlorate ion, which are selected as required. Preferably, the counter ions include $Cl^-$, $Br^-$ and $I^-$.

Specific examples of the quaternary ammonium halides include tetramethylammonium chloride, trimethylethylammonium chloride, trimethylphenylammonium chloride, trimethylbenzylammonium chloride, tetraethylammonium chloride, triethylmethylammonium chloride, triethylphenylammonium chloride and triethylbenzylammonium chloride.

The concentration of the quaternary ammonium halide is preferably in the range of from 0.01 to 2.0 moles/liter. The molar ratio of the quaternary ammonium halide to the aluminium halide is preferably in the range of from 0.5 to 2:1. If the molar ratio is less than 0.5, part of the aluminium halide may not be dissolved in the electrolyte. If the molar ratio is over 1, part of the quaternary ammonium halide may not be dissolved.

Where the non-aqueous electrolyte of the invention is used for electrodeposition of Al, the electrodeposition favorably proceeds under conditions where the concentration of the aluminium halide is higher than that of the quaternary ammonium halide. Accordingly, it is preferred that the molar ratio of the quaternary ammonium halide to the aluminium halide is in the range of 0.5:1 to 1:1, more preferably from 0.5:1 to 0.75:1.

The non-aqueous solvents for dissolution of both the quaternary ammonium halide and the aluminium halide may be compounds ordinarily used in known lithium electrochemical cells. Examples of the solvent include propylene carbonate, acetonitrile, γ-butyrolactone, tetrahydrofuran, 2-methyl-tetrahydrofuran, dimethoxyethane, and mixtures thereof. In this case, these solvents should be subjected to dehydration to fully remove the moisture therefrom. In view of the solubility of anhydrous alkyl quaternary ammonium halides, it is preferred to use propylene carbonate or a mixed solvent of propylene carbonate and dimethyl carbonate. If the mixed solvent propylene carbonate and dimethyl carbonate is used, the content of dimethyl carbonate should preferably be up to 80% by volume.

Moreover, dehydrated acetonitrile or dehydrated organic solvents having a donor number not larger than 5 are also preferably used as the non-aqueous solvent of the invention. The term donor number is intended to mean a degree of Lewis basicity of solvent which is defined by selecting $1 \times 10^{-3}$ mol·dm$^{-3}$ of antimony pentachloride in 1,2-dichloroethane as a standard acceptor and determining an molar enthalpy value (kcal·mol$^{-1}$) for the reaction between the acceptor and a donor (solvent). A smaller value means in a lower basicity. Organic solvents having a donor number of not larger than 5 include, for example, 1,2-dichloroethane, 1,2-dichlorobenzene, 1,3-dichlorobenzene, and the like. These solvents having a donor number of not larger than 5 are preferred especially when the non-aqueous electrolyte is used for the electrodeposition of Al. This is for the following reason: the organic solvent having a donor number of not larger than 5 is adapted for reversible dissolution of once electrodeposited aluminium. Accordingly, when an organic solvent having a donor number of not larger than 5 is used as a solvent of the non-aqueous electrolyte, the resultant electrolyte may be usable as a non-aqueous electrolyte for secondary rechargeable cells.

Figure 6:
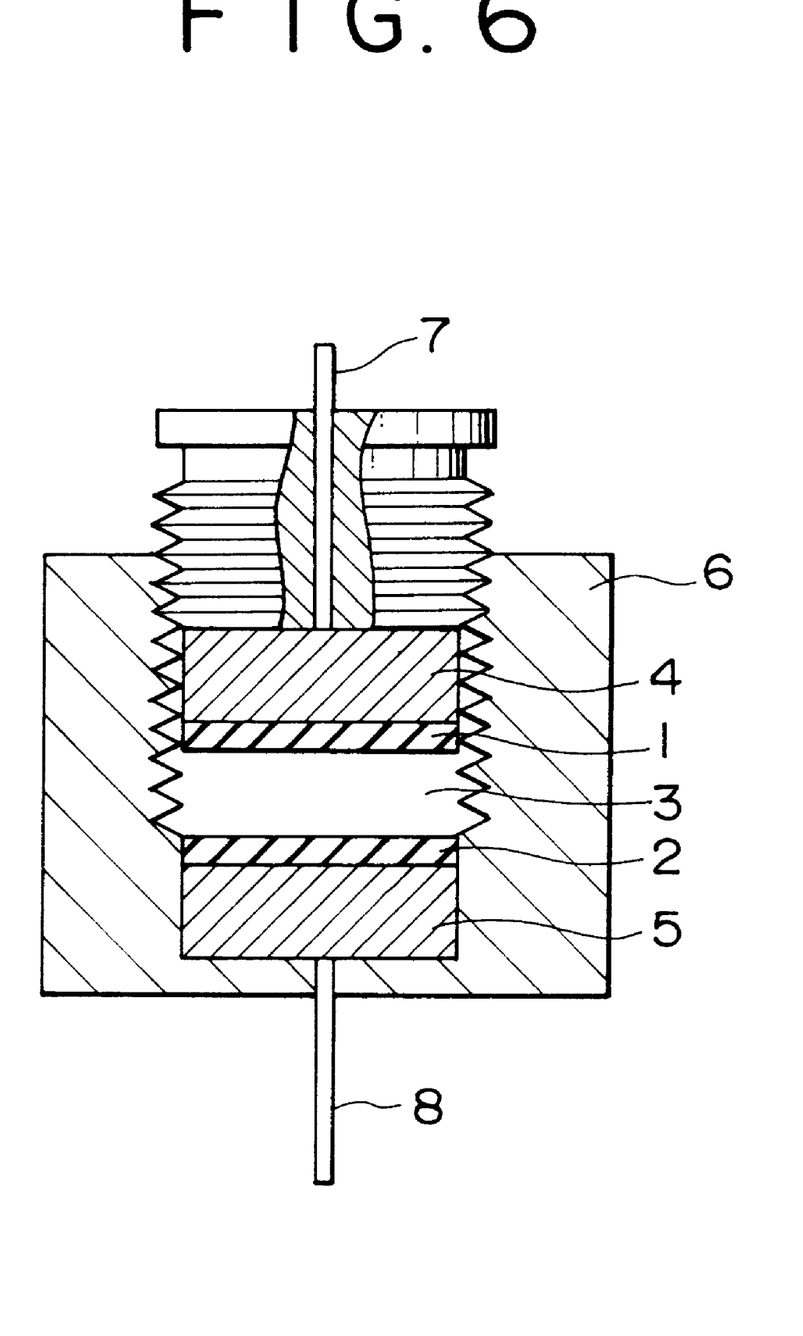
FIG. 6 is a schematic view of a cell according to the invention.

Reference is now made to FIG. 6 which schematically shows a cell C according to the invention. The cell C includes a unit U which has an anode pellet 1, and a cathode 2 provided in a spaced relation with the anode pellet 1. A separator 3 is provided in the unit U between the anode 1 and the cathode 2. The cell unit U is accomodated in a resin casing 6. As a matter of course, current collectors 4, 5 may be, respectively, provided in contact with the anode 1 and the cathode 2. Leads 7, 8 are connected to the current collector 4, 5, respectively, as shown in the figure.

The cathode 1 should be made of Al or an Al alloy. Examples of the Al alloy include Al-Mg alloys having 97 to 99 atomic % of Al and, correspondingly, from 3 to 1 atomic % of Mg, and those alloys defined in JIS and including, for example, Al alloy Nos. 1100 (1.0 atomic % of Si+Fe, 0.05 to 0.20 atomic % of Cu, 0.05 atomic % of Mn, 0.10 atomic % of Zn and the balance of Al, 3003 (0.6 atomic % of Si, 0.7 atomic % of Fe, 0.05 to 0.20 atomic % of Cu, 1.0 to 1.5 atomic % of Mn, 0.10 atomic % of Zn and the balance of Al, 5052 (0.3 atomic % of Si, 0.7 atomic % of Fe, 0.20 atomic % of Cu, 0,10 atomic % of Mn, 2.2 to 2.8 atomic % of Mg, 0.10 atomic % of Cr, 0.25 atomic % of Zn and the balance of Al, and 6963 (from 0.20 to 0.60 atomic % of Si, 0.35 atomic % of Fe, 0.10 atomic % of Cu, 0.10 atomic % of Mn, 0.45 to 0.90 atomic % of Mg, 0.10 atomic % of Cr, 0.10 atomic % of Zn, 0.10 atomic % of Ti and the balance of Al. The cathode 2 may be made of compositions which are ordinarily used for this purpose and comprise conductive agents and binder resins. A typical composition comprises manganese dioxide, conductive agents such as graphite, and resin binders such as fluorocarbon resins.

The non-aqueous electrolyte 3 is one which has been set out hereinabove. The casing 6 may be made of resins such as fluorocarbon resins and the like.

Thus, the cell of the invention may be arranged by a usual manner except that the anode consists of Al or its alloy and the non-aqueous electrolyte is comprised of an aluminium halide and a quaternary ammonium halide.

Since the non-aqueous electrolyte of the invention comprises, in a non-aqueous solvent, an aluminium halide and a quaternary ammonium halide, the conductivity is pronouncedly improved. Accordingly, when this electrolyte is used to arrange a cell having an Al or Al alloy anode, breakage of the passive state oxide layer at the anode takes place readily at the time of discharge. Eventually, the electrochemical activity at the anode are improved, with good discharge characteristics.

As stated above, the non-aqueous electrolyte of the invention comprises an aluminium halide and a quaternary ammonium halide. Accordingly, it is possible to electrodeposit Al from the electrolyte. The electrodeposition may be conducted by any known procedures under known electrodepositing conditions except that the non-aqueous electrolyte of the invention is used.

The invention is more particularly described by way of examples.

EXAMPLE 1

10 wt % of graphite as a conductive material and 5 wt % of a fluorocarbon resin powder as a binder were added to 85 wt % of electrolytic manganese dioxide which had been annealed at a predetermined temperature, followed by mixing and shaping to obtain a cathode.

Separately, a 100 μm thick aluminium sheet was provided as a cathode.

Figure 1:
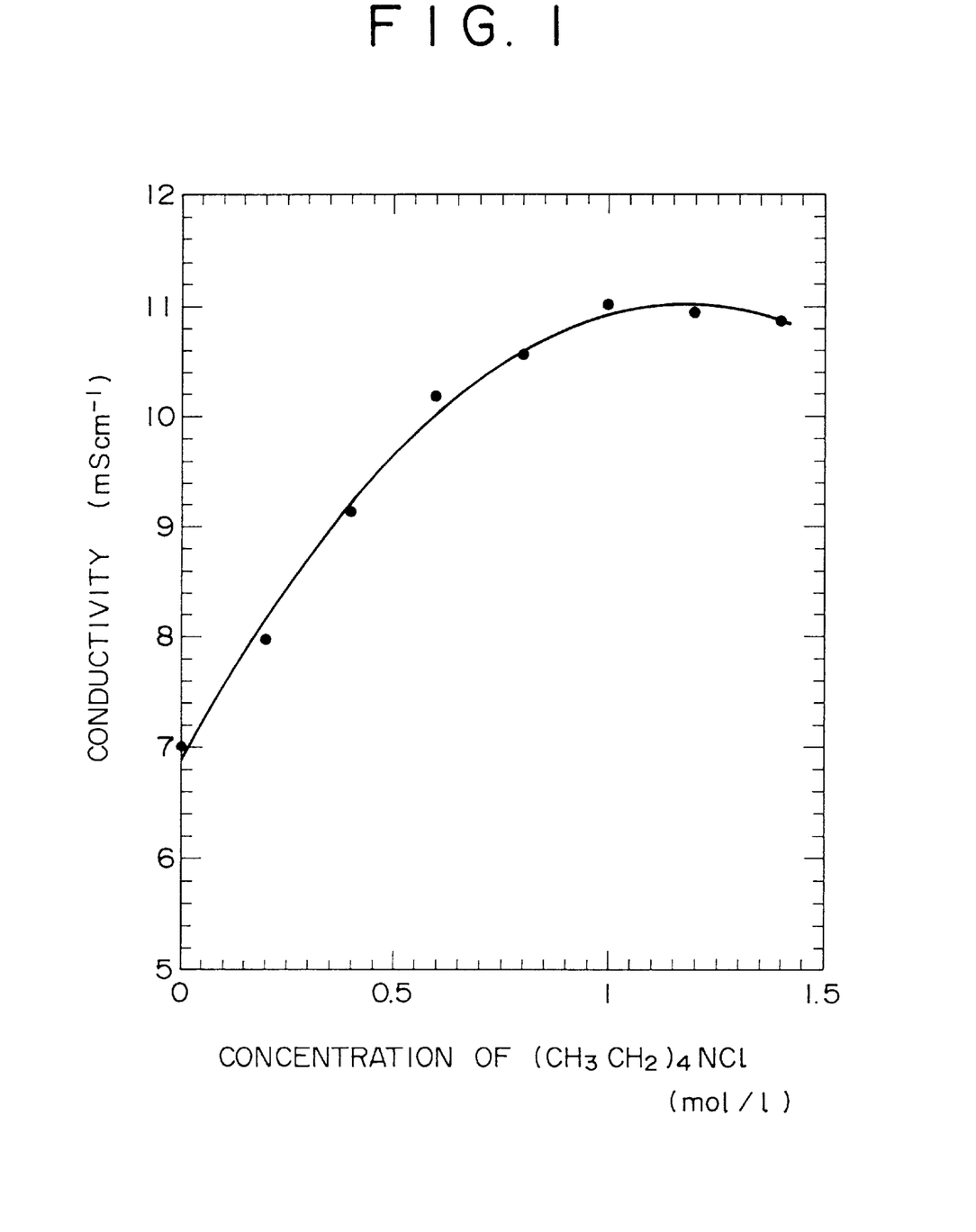
FIG. 1 is a graph showing the relation between the concentration of tetraethylammonium chloride (($CH_3CH_2$)$_4$N.Cl) in a non-aqueous electrolyte of the invention and the conductivity.

Anhydrous aluminium chloride ($AlCl_3$) was dissolved in dehydrated propylene carbonate at a concentration of 1.0 mole/liter, followed by dissolution of anhydrous tetraethylammonium chloride thereby obtaining a non-aqueous electrolyte solution. In this connection, the amount of tetraethylammonium chloride being dissolved was changed to measure conductivity. The results are shown in FIG. 1, From the figure, it will be seen that as the concentration of tetraethylammonium chloride increases, the conductivity also increases. The conductivity is beyond a level which is necessary for practical applications.

A non-aqueous electrolyte wherein the concentration of tetraethylammonium chloride is 1.0 mole/liter or whose conductivity is the highest among the non-aqueous electrolytes indicated in FIG. 1, was used to fabricate a cell along with the anode and the cathode indicated hereinbefore. The cell was subjected to measurement of discharge characteristics while discharging at constant currents of 0.1 mA and 0.3 mA, respectively. The results are shown in FIGS. 2 and 3.

Comparative Example 1

The general procedure of Example 1 was repeated without use of anhydrous tetramethylammonium chloride, thereby obtaining a non-aqueous electrolyte and making a cell using the electrolyte. The cell was subjected to measurement of discharge characteristics. The results are shown in FIGS. 2 and 3.

Figure 2:
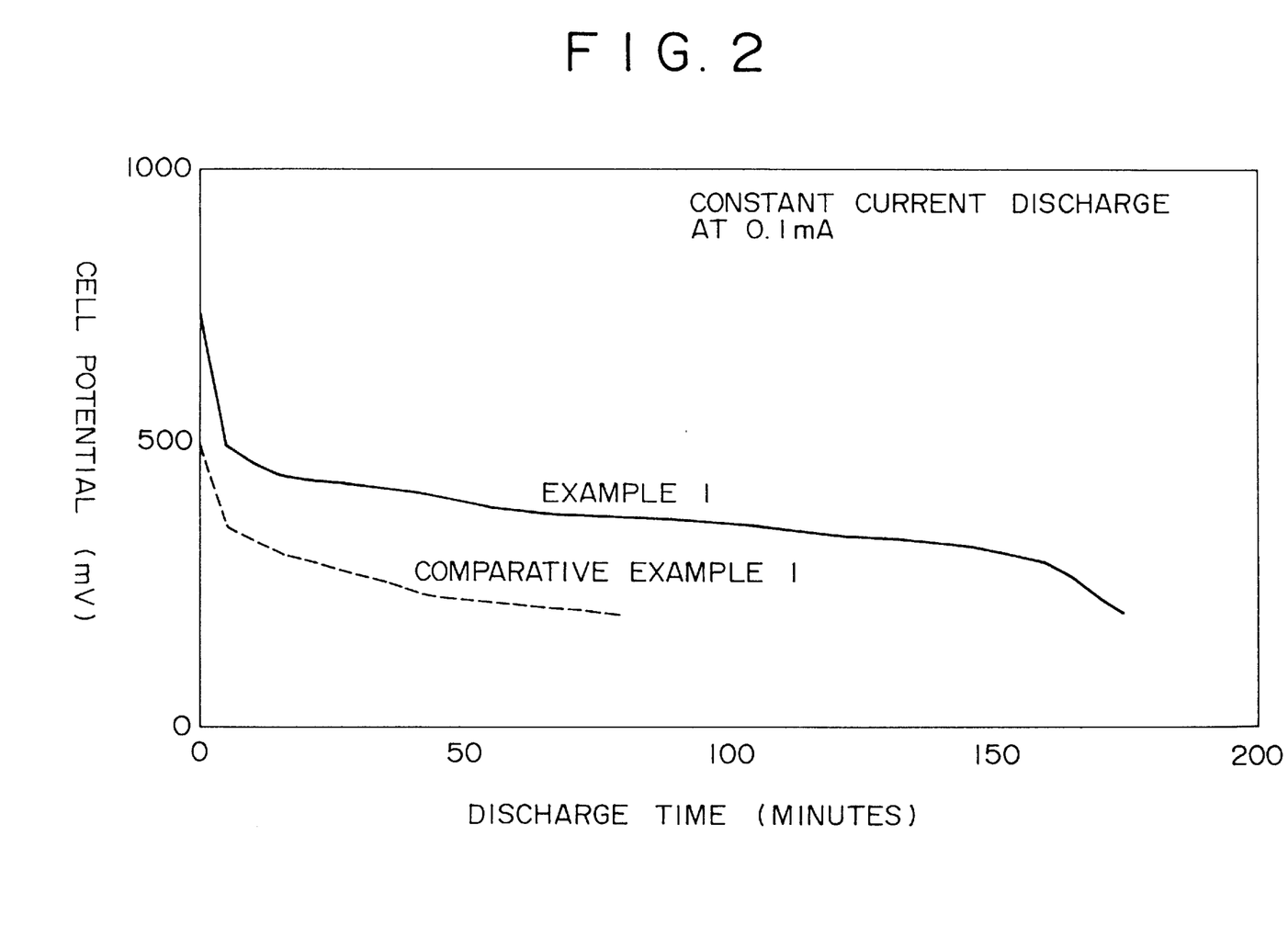
FIG. 2 is a graph showing the relation between the cell voltage and the discharge time for a cell of the invention and a cell for comparison.
Figure 3:
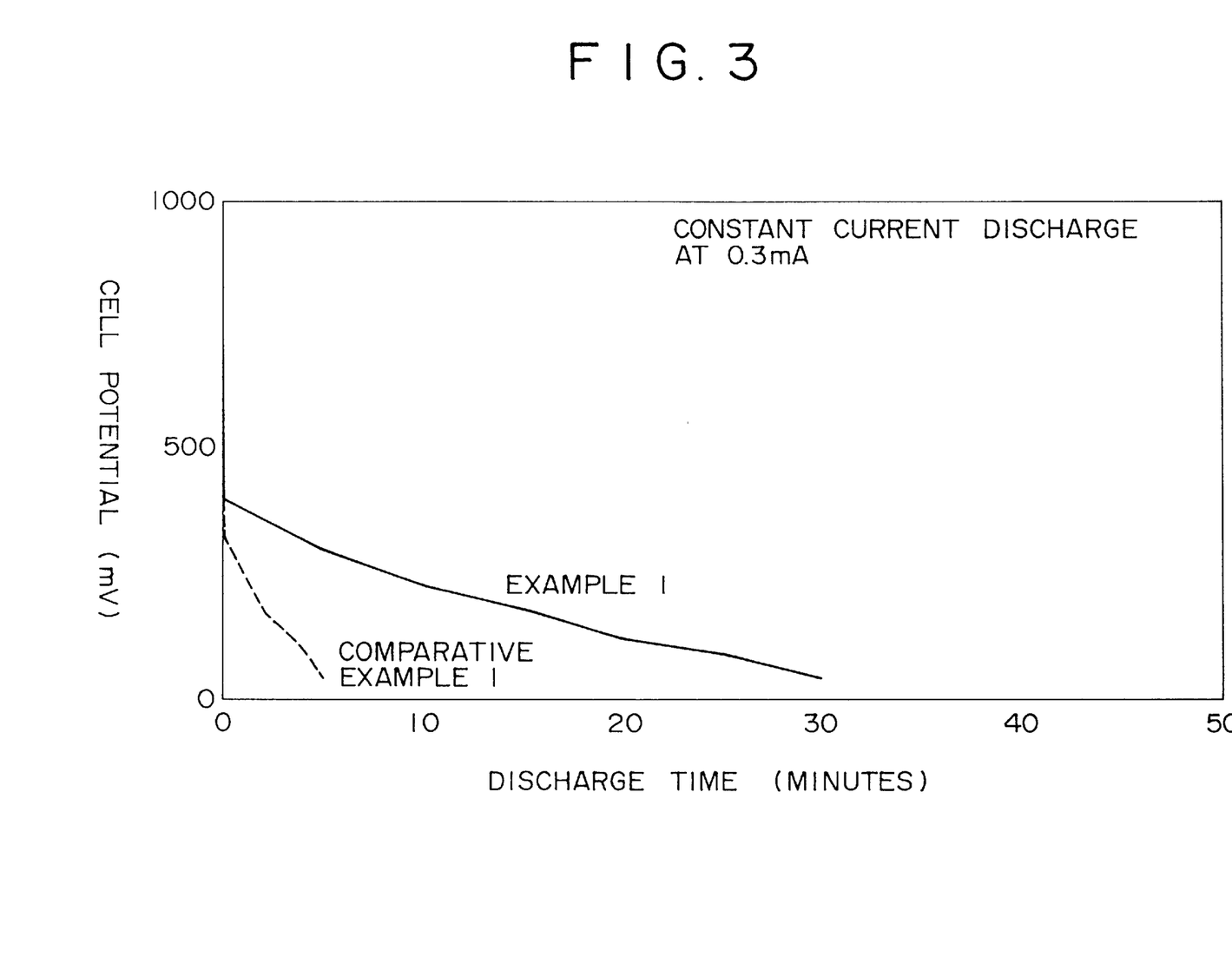
FIG. 3 is a graph similar to FIG. 2 but at a different discharge current.

From the results of FIGS. 2 and 3, the cell of Example 1 has a greater utilization efficiency of the anode than that of Comparative Example 1. Moreover, the load characteristic is also improved.

Comparative Example 2

The general procedure of Example 1 was repeated except that anhydrous aluminium chloride was not used, thereby obtaining a non-aqueous electrolyte and making a cell. This cell was not worked as a cell.

EXAMPLE 2

Figure 4:
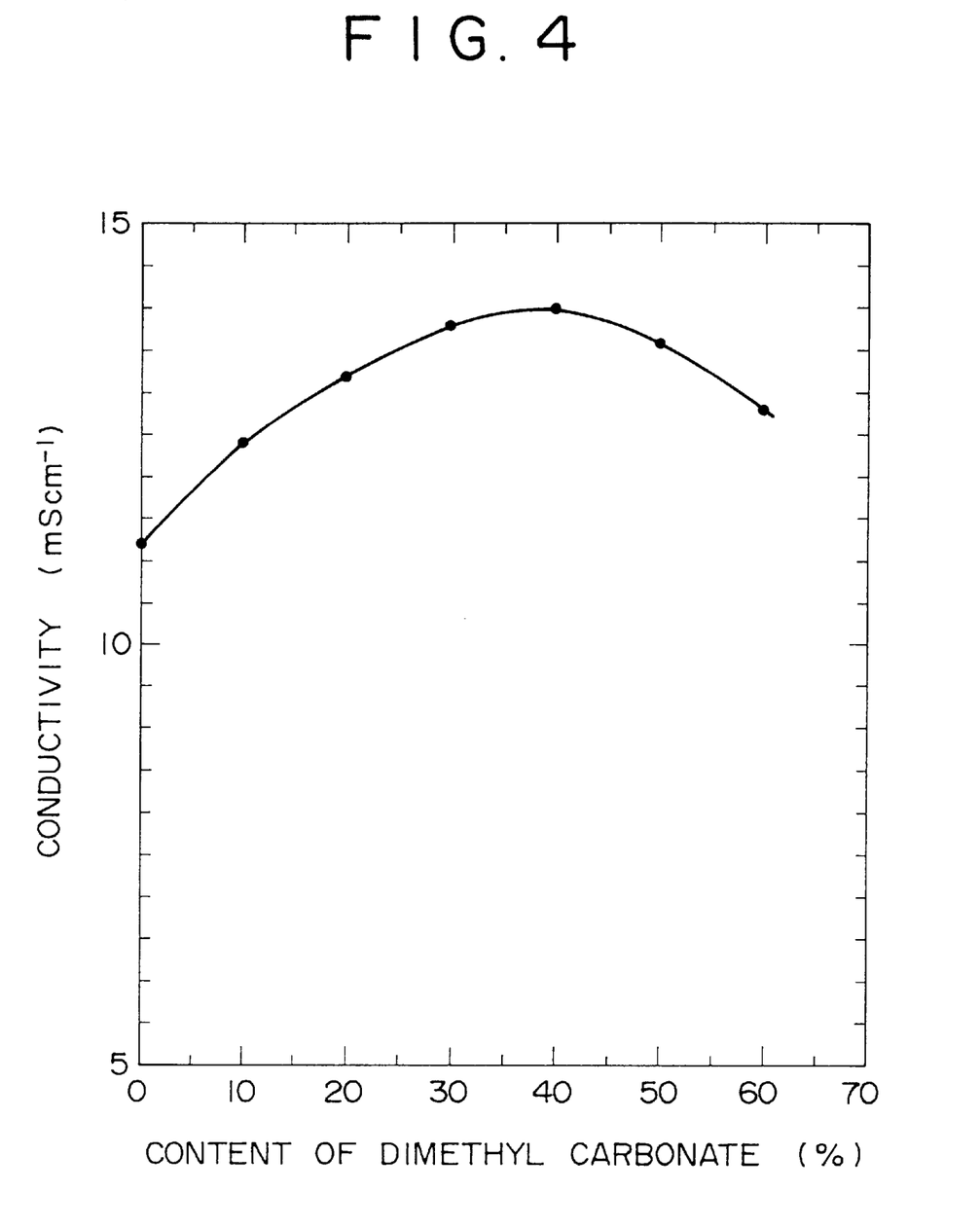
FIG. 4 is a graph showing the relation between the concentration of dimethyl carbonate in a non-aqueous electrolyte of the invention and the conductivity.

Anhydrous aluminium chloride and anhydrous tetraethylammonium chloride were, respectively, dissolved, each in an amount of 1.0 mole/liter, in mixed solvents of dehydrated propylene carbonate and dimethyl carbonate at different ratios, thereby obtaining a non-aqueous electrolyte. More particularly, the mixing ratios of the propylene carbonate and dimethyl carbonate were changed. The resultant electrolytes were subjected to measurement of conductivity. The results are shown in FIG. 4. FIG. 4 reveals that the conductivity increases with an increasing content of the dimethyl carbonate.

Figure 5:
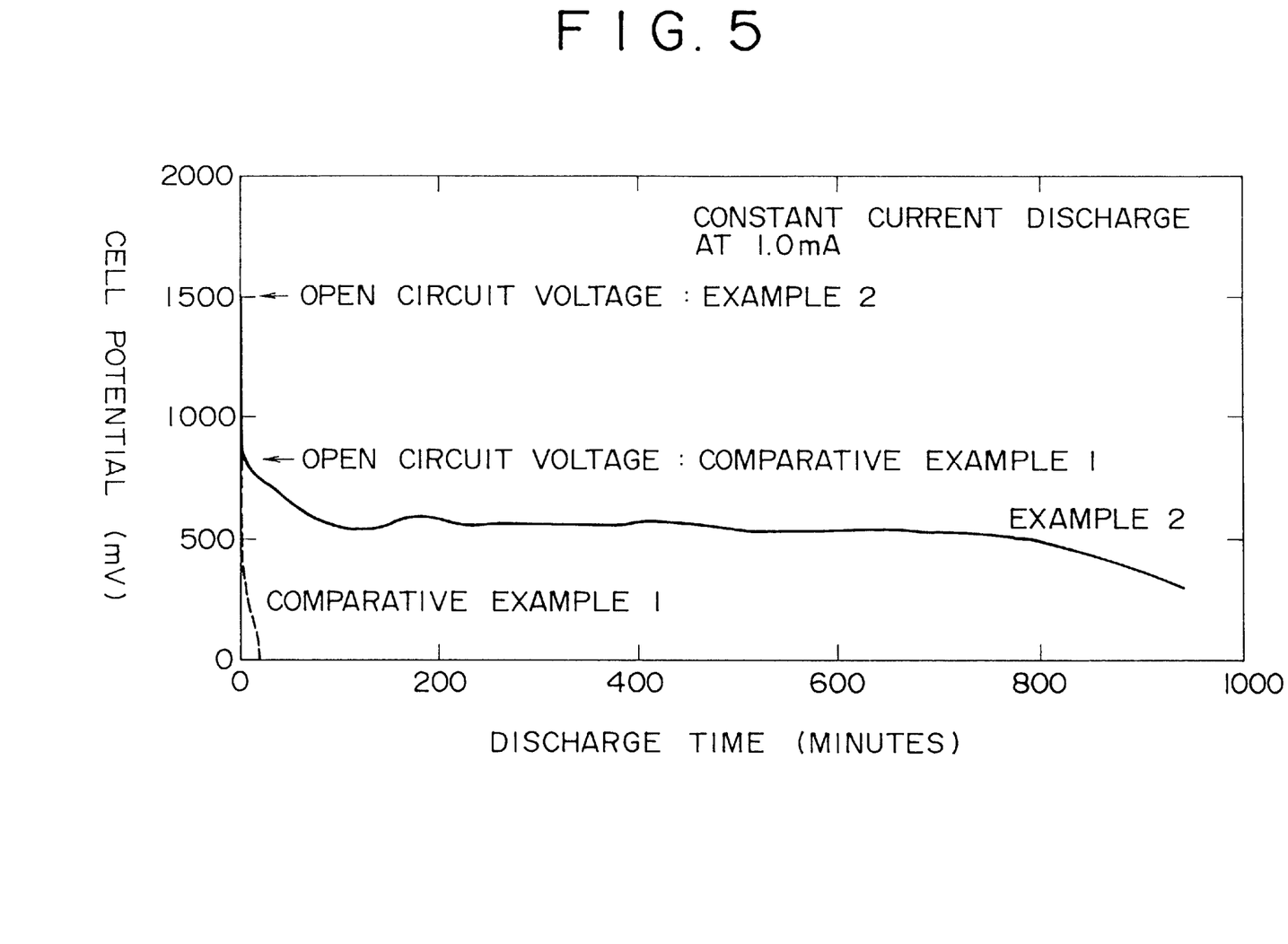
FIG. 5 is a graph showing the relation between the cell voltage and the discharge time at a constant current of 1 mA for a cell of the invention and a cell for comparison.

The non-aqueous electrolyte having a mixing ratio of propylene carbonate and dimethyl carbonate of 3:2 with which the conductivity becomes the highest among those electrolytes shown in FIG. 4 was used to make a cell along with the anode and cathode of Example 1. The cell was subjected to measurement of discharge characteristic at constant currents of 0.1 mA and 1.0 mA, respectively. With the constant current discharge at 0.1 mA, 10000 minutes or more cycles of discharge were possible. When the discharge was effected at a constant current of 1.0 mA, a good discharge characteristic as shown in FIG. 5 could be obtained.

Comparative Example 3

The general procedure of Example 2 was repeated without use of anhydrous tetraethylammonium chloride, thereby obtaining a non-aqueous electrolyte and making a cell. The cell was subjected to measurement of a discharge characteristic. With a constant current discharge at 0.1 mA, discharge became impossible after several minutes. The results of the constant current discharge at 1.0 mA are shown in FIG. 5.

These results reveal that the cell of Example 2 has a high utilization efficiency than the cell of Comparative Example 3, with the load characteristic being improved.

EXAMPLE 3

3.3 moles/liter of anhydrous aluminium chloride and 1.65 moles/liter of anhydrous trimethylphenylammonium chloride were dissolved in dehydrated 1,2-dichlorobenzene to obtain a non-aqueous electrolyte.

A cathode made of a platinum plate and an anode made of an Al plate were immersed in the non-aqueous electrolyte. A current with a quantity of 0.4 mA·hr/$cm^2$ was passed to both plates at 25° C., whereupon a thin film with a metallic luster was formed on the platinum plate surface. The thin film was subjected to analysis by means of an energy dispersed X-type analyzer (Delta Systems, Kebech Inc.), revealing that the film consisted of Al.

When the current was passed to the platinum and aluminium plates while reversing the polarities, the thin film having a metallic luster on the platinum plate was dissolved in the electrolyte. By this, it was confirmed that the electrodeposition and dissolution of Al could be reversibly realized.

EXAMPLE 4

The general procedure of Example 3 was repeated using 1,2-dichloroethane as the non-aqueous solvent, thereby obtaining a non-aqueous electrolyte and electrodepositing aluminium. The resultant Al thin film had a smooth surface and could be reversibly dissolved in the electrolyte.

EXAMPLE 5

The general procedure of Example 3 was repeated using acetonitrile as the non-aqueous solvent, thereby obtaining a non-aqueous electrolyte and electrodepositing aluminium. The resultant Al thin film had a smooth surface.

EXAMPLE 6

The general procedure of Example 3 was repeated except that 1.5 moles/liter of trimethylbenzylammonium chloride was used as the quaternary ammonium salt and that the concentration of aluminium chloride was 3.0 mole/liter, thereby obtaining a non-aqueous electrolyte and electrodepositing aluminium. The resultant aluminium thin film had a smooth surface. The thin film could be reversibly dissolved in the electrolyte.

EXAMPLE 7

The general procedure of Example 6 was repeated using 1,2-dichloroethane as the non-aqueous solvent, thereby obtaining a non-aqueous electrolyte and electrodepositing aluminium. The resultant Al thin film had a smooth surface and could be reversibly dissolved in the electrolyte.

EXAMPLE 8

The general procedure of Example 6 was repeated using acetonitrile as the non-aqueous solvent, thereby obtaining a non-aqueous electrolyte and electrodepositing aluminium therefrom. The resultant Al thin film had a smooth surface.

EXAMPLE 9

The general procedure of Example 3 was repeated except that tetraethylammonium chloride was used as the quaternary ammonium salt and 1,2-dichloroethane was used as the non-aqueous solvent and that the concentration of aluminium chloride was 2.0 moles/liter and the concentration of the tetraethylammonium chloride was 1.0 mole/liter, thereby obtaining a non-aqueous electrolyte and electrodepositing aluminium. The resultant Al thin film had a smooth surface and could be reversibly dissolved in the electrolyte.

EXAMPLE 10

The general procedure of Example 9 was repeated using 1,2-dichlorobenzene as the non-aqueous solvent, thereby obtaining a non-aqueous electrolyte and electrodepositing aluminium therefrom. The resultant Al thin film had a smooth surface and could be reversibly dissolved in the electrolyte.

EXAMPLE 11

The general procedure of Example 9 was repeated using acetonitrile as the non-aqueous solvent, thereby obtaining a non-aqueous electrolyte and electrodepositing aluminium therefrom. The resultant Al thin film had a smooth surface.

EXAMPLE 12

The general procedure of Example 3 was repeated using triethylmethylammonium chloride as the quaternary ammonium salt, thereby obtaining a non-aqueous electrolyte and electrodepositing aluminium therefrom. The resultant Al thin film had a smooth surface and could be reversibly dissolved in the electrolyte.

EXAMPLE 13

The general procedure of Example 12 was repeated using 1,2-dichloroethane as the non-aqueous solvent, thereby obtaining a non-aqueous electrolyte and electrodepositing aluminium therefrom. The resultant Al thin film had a smooth surface and could be reversibly dissolved in the electrolyte.

EXAMPLE 14

The general procedure of Example 12 was repeated using acetonitrile as the non-aqueous solvent, thereby obtaining a non-aqueous electrolyte and electrodepositing aluminium therefrom. The resultant Al thin film had a smooth surface.

EXAMPLE 15

The general procedure of Example 3 was repeated except that triethylphenylammonium chloride was used as the quaternary ammonium salt and 1,2-dichloroethane was used as the non-aqueous solvent and that the concentration of aluminium chloride was 4.0 moles/liter and the concentration of the triethylphenylammonium chloride was 2.5 moles/liter, thereby obtaining a non-aqueous electrolyte and electrodepositing aluminium. The resultant Al thin film had a smooth surface and could be reversibly dissolved in the electrolyte.

EXAMPLE 16

The general procedure of Example 15 was repeated using 1,2-dichloroethane as the non-aqueous solvent, thereby obtaining a non-aqueous electrolyte and electrodepositing aluminium therefrom. The resultant Al thin film had a smooth surface and could be reversibly dissolved in the electrolyte.

EXAMPLE 17

The general procedure of Example 15 was repeated using acetonitrile as the non-aqueous solvent, thereby obtaining a non-aqueous electrolyte and electrodepositing aluminium therefrom. The resultant Al thin film had a smooth surface.

EXAMPLE 18

The general procedure of Example 3 was repeated using triethylbenzylammonium chloride as the quaternary ammonium salt, thereby obtaining a non-aqueous electrolyte and electrodepositing aluminium therefrom. The resultant Al thin film had a smooth surface and could be reversibly dissolved in the electrolyte.

EXAMPLE 19

The general procedure of Example 18 was repeated using 1,2-dichloroethane as the non-aqueous solvent, thereby obtaining a non-aqueous electrolyte and electrodepositing aluminium therefrom. The resultant Al thin film had a smooth surface and could be reversibly dissolved in the electrolyte.

EXAMPLE 20

The general procedure of Example 18 was repeated using acetonitrile as the non-aqueous solvent, thereby obtaining a non-aqueous electrolyte and electrodepositing aluminium therefrom. The resultant Al thin film had a smooth surface.

EXAMPLE 21

The general procedure of Example 3 was repeated using tetramethylammonium chloride as the quaternary ammonium salt, thereby obtaining a non-aqueous electrolyte and electrodepositing aluminium therefrom. The resultant Al thin film had a smooth surface and could be reversibly dissolved in the electrolyte.

EXAMPLE 22

The general procedure of Example 21 was repeated using 1,2-dichloroethane as the non-aqueous solvent, thereby obtaining a non-aqueous electrolyte and electrodepositing aluminium therefrom. The resultant Al thin film had a smooth surface and could be reversibly dissolved in the electrolyte.

EXAMPLE 23

The general procedure of Example 21 was repeated using acetonitrile as the non-aqueous solvent, thereby obtaining a non-aqueous electrolyte and electrodepositing aluminium therefrom. The resultant Al thin film had a smooth surface.

EXAMPLE 24

The general procedure of Example 3 was repeated except that a copper plate was used as the cathode, thereby obtaining a non-aqueous electrolyte, electrodepositing aluminium and reversibly dissolving the deposited aluminium. Ten cycles of the electrodeposition and dissolution of aluminium were repeated. As a result, the deposited aluminium obtained after the ten cycles was free of any arborescent surface and had a smooth surface. Accordingly, when a secondary cell was fabricated using the non-aqueous electrolyte of this example, short-circuiting between the cathode and the anode at the time of charge could be prevented.

EXAMPLE 25

The general procedure of Example 24 was repeated using 1,2-dichloroethane as the non-aqueous solvent, thereby obtaining a non-aqueous electrolyte, electrodepositing aluminium therefrom and reversibly dissolving the aluminium. As a result, it was found that the surface of the deposited aluminium after the ten cycles was not dendritic but smooth.

EXAMPLE 26

The general procedure of Example 24 was repeated except that trimethylbenzylammonium chloride was used as the quaternary ammonium salt and that the concentration of aluminium chloride was 3.0 moles/liter and the concentration of the trimethylbenzylammonium chloride was 1.5 moles/liter, thereby obtaining a non-aqueous electrolyte, electrodepositing aluminium and reversibly dissolving the deposited aluminium. As a result, it was found that the surface of the deposited aluminium after the ten cycles was not dendritic but smooth.

EXAMPLE 27

The general procedure of Example 26 was repeated using 1,2-dichloroethane as the non-aqueous solvent, thereby obtaining a non-aqueous electrolyte, electrodepositing aluminium therefrom and reversibly dissolving the aluminium. As a result, it was found that the surface of the deposited aluminium after the ten cycles was not dendritic but smooth.

EXAMPLE 28

The general procedure of Example 24 was repeated except that tetraethylammonium chloride was used as the quaternary ammonium salt and that the concentration of aluminium chloride was 2.0 moles/liter and the concentration of the tetraethylammonium chloride was 1.0 mole/liter, thereby obtaining a non-aqueous electrolyte, electrodepositing aluminium and reversibly dissolving the deposited aluminium. As a result, it was found that the surface of the deposited aluminium after the ten cycles was not dendritic but smooth.

EXAMPLE 29

The general procedure of Example 28 was repeated using 1,2-dichloroethane as the non-aqueous solvent, thereby obtaining a non-aqueous electrolyte, electrodepositing aluminium therefrom and reversibly dissolving the aluminium. As a result, it was found that the surface of the deposited aluminium after the ten cycles was not dendritic but smooth.

EXAMPLE 30

The general procedure of Example 24 was repeated using triethylmethylammonium chloride as the quaternary ammonium salt, thereby obtaining a non-aqueous electrolyte, electrodepositing aluminium therefrom and reversibly dissolving the aluminium. As a result, it was found that the surface of the deposited aluminium after the ten cycles was not dendritic but smooth.

EXAMPLE 31

The general procedure of Example 30 was repeated using 1,2-dichloroethane as the non-aqueous solvent, thereby obtaining a non-aqueous electrolyte, electrodepositing aluminium therefrom and reversibly dissolving the aluminium. As a result, it was found that the surface of the deposited aluminium after the ten cycles was not dendritic but smooth.

EXAMPLE 32

The general procedure of Example 30 was repeated except that triethylphenylammonium chloride was used as the quaternary ammonium salt and 1,2-dichloroethane was used as the non-aqueous solvent and that the concentration of aluminium chloride was 4.0 moles/liter and the concentration of the triethylphenylammonium chloride was 2.5 moles/liter, thereby obtaining a non-aqueous electrolyte, electrodepositing aluminium and reversibly dissolving the deposited aluminium. As a result, it was found that the surface of the deposited aluminium after the ten cycles was not dendritic but smooth.

EXAMPLE 33

The general procedure of Example 32 was repeated using 1,2-dichloroethane as the non-aqueous solvent, thereby obtaining a non-aqueous electrolyte, electrodepositing aluminium therefrom and reversibly dissolving the aluminium. As a result, it was found that the surface of the deposited aluminium after the ten cycles was not dendritic but smooth.

EXAMPLE 34

The general procedure of Example 24 was repeated using triethylbenzylammonium chloride as the quaternary ammonium salt, thereby obtaining a non-aqueous electrolyte, electrodepositing aluminium therefrom and reversibly dissolving the aluminium. As a result, it was found that the surface of the deposited aluminium after the ten cycles was not dendritic but smooth.

EXAMPLE 35

The general procedure of Example 34 was repeated using 1,2-dichloroethane as the non-aqueous solvent, thereby obtaining a non-aqueous electrolyte, electrodepositing aluminium therefrom and reversibly dissolving the aluminium. As a result, it was found that the surface of the deposited aluminium after the ten cycles was not dendritic but smooth.

As will be apparent from the foregoing, the non-aqueous electrolyte of the invention is applied to a cell which has an Al or Al alloy anode, the polarity at the time of discharge of the cell can be reduced with good discharge characteristics. Moreover, aluminium can be electrodeposited in this non-aqueous electrolyte. The reversible cycle of the electrodeposition and dissolution of aluminium is possible, so that it will be possible to make a secondary cell which has good charge and discharge characteristics and a high energy density.

What is claimed is:

1. A non-aqueous electrolyte comprising an aluminum halide and a quaternary ammonium halide in a non-aqueous solvent selected from the group consisting of 1,2-dichlorobenzene, 1,3-dichlorobenzene and mixtures thereof.

2. A method for the electrodeposition of aluminum comprising the step of subjecting a non-aqueous electrolyte including an aluminum halide and a quaternary ammonium halide in a non-aqueous solvent selected from the group consisting of 1,2-dichlorobenzene, 1,3-dichlorobenzene and mixtures thereof.

* * * * *